G. W. WHITTINGTON.
WIRE FABRIC MACHINE.
APPLICATION FILED DEC. 11, 1911.
1,061,432.
Patented May 13, 1913.
7 SHEETS—SHEET 1.
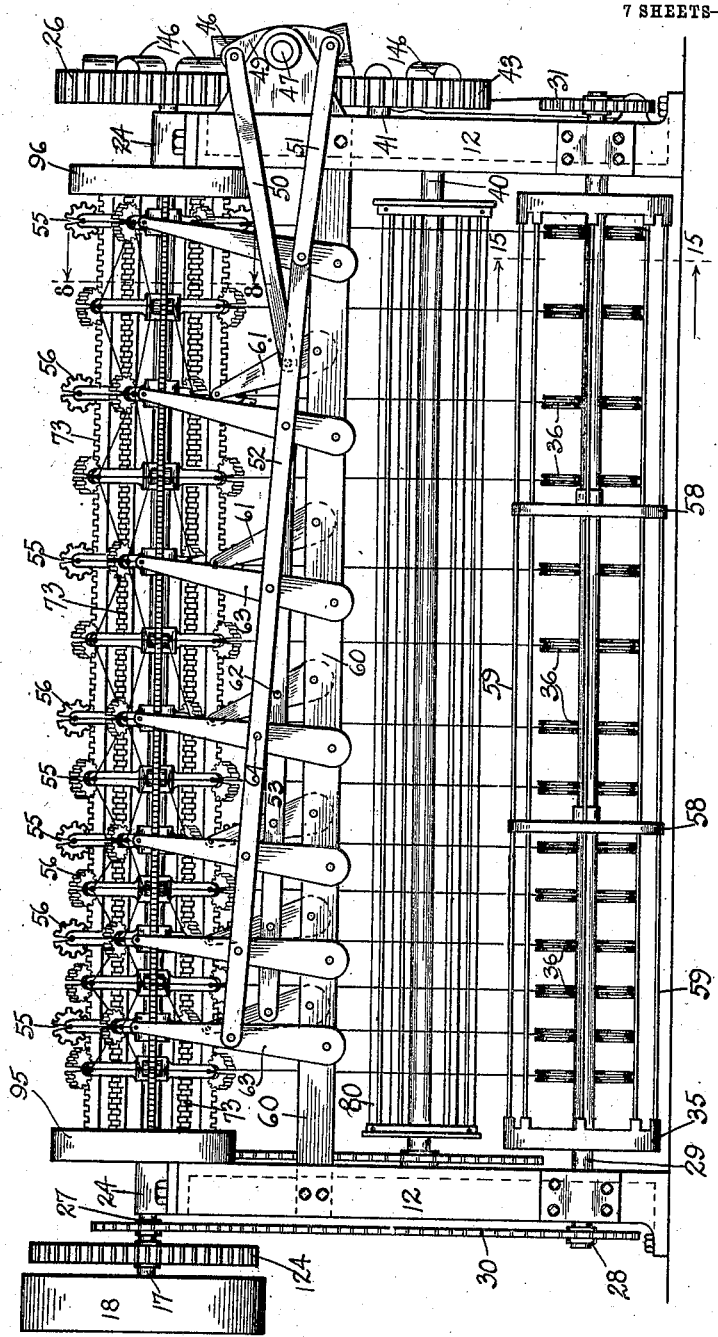
WITNESSES:
INVENTOR.
George W. Whittington.
BY
ATTORNEY.

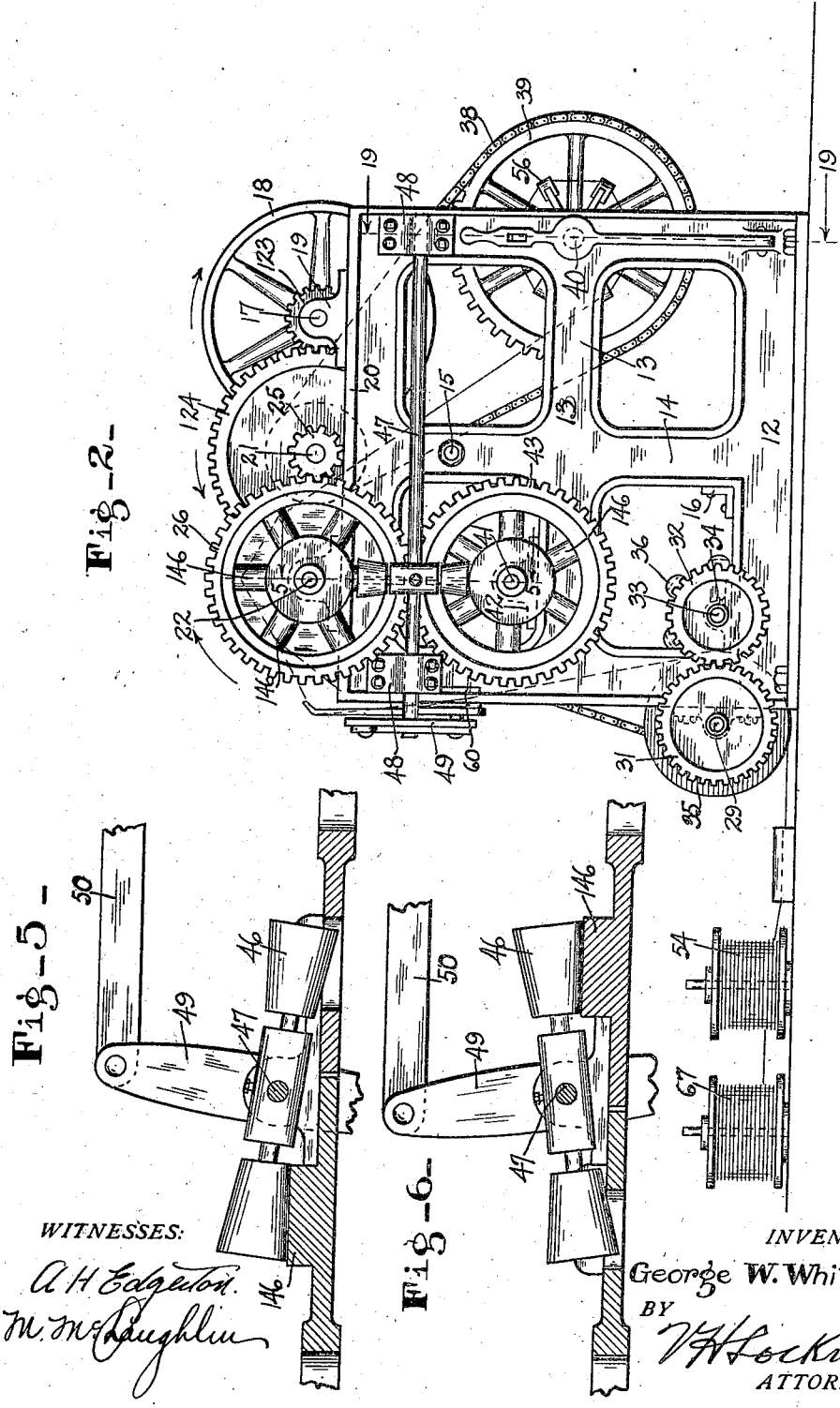

G. W. WHITTINGTON
WIRE FABRIC MACHINE.
APPLICATION FILED DEC. 11, 1911.
1,061,432.
Patented May 13, 1913.
7 SHEETS—SHEET 3.
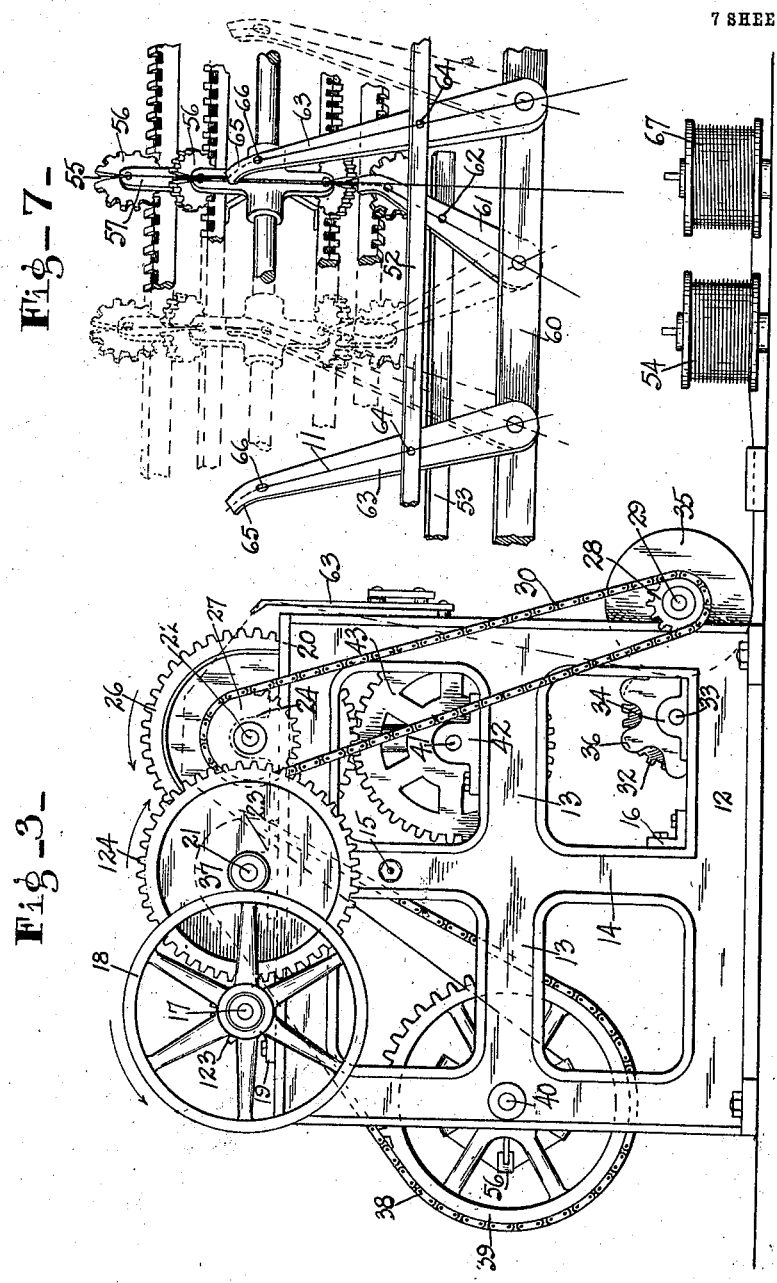
WITNESSES:
A. H. Edgerton
O. M. McLaughlin
INVENTOR.
George W. Whittington.
BY
V. H. Lockwood
ATTORNEY.

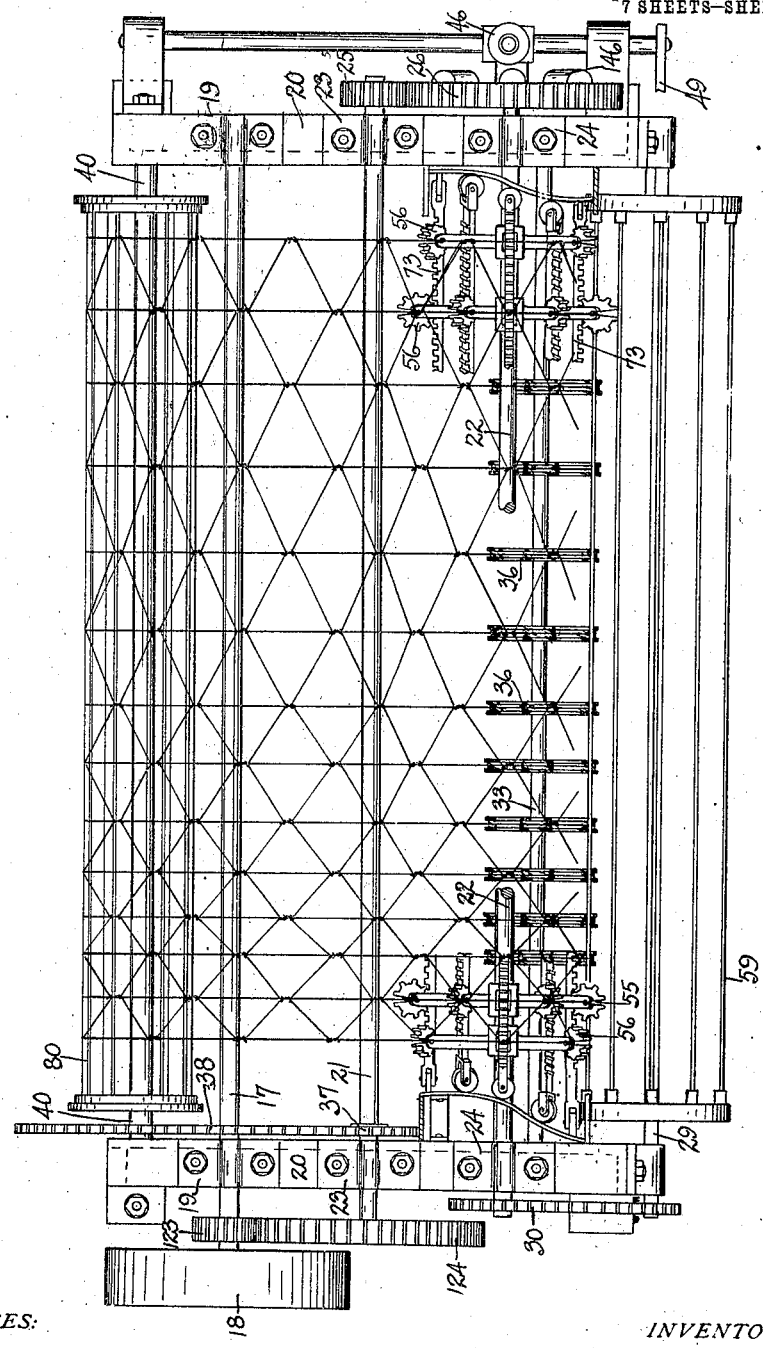

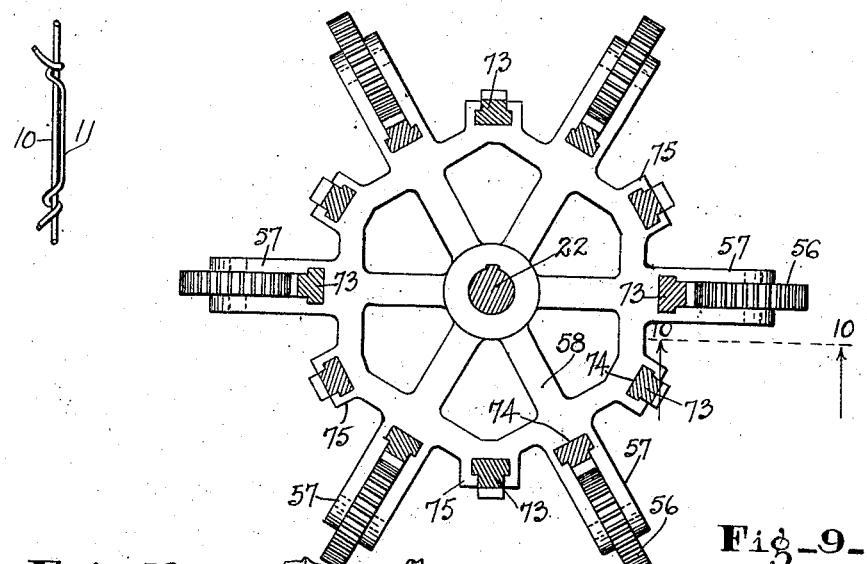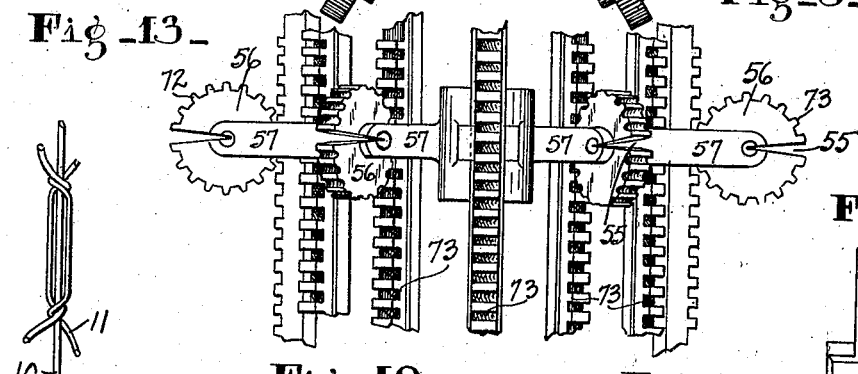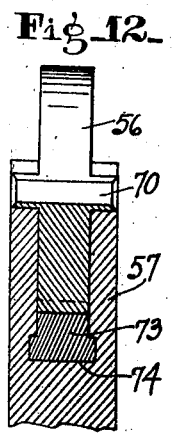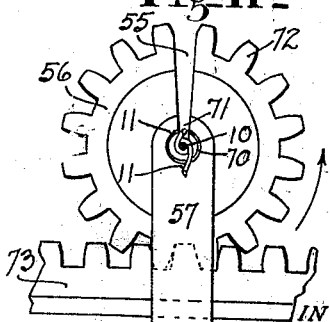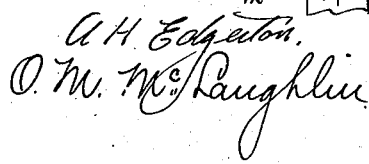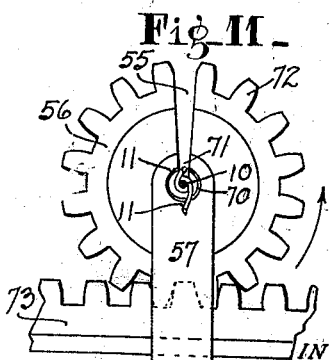

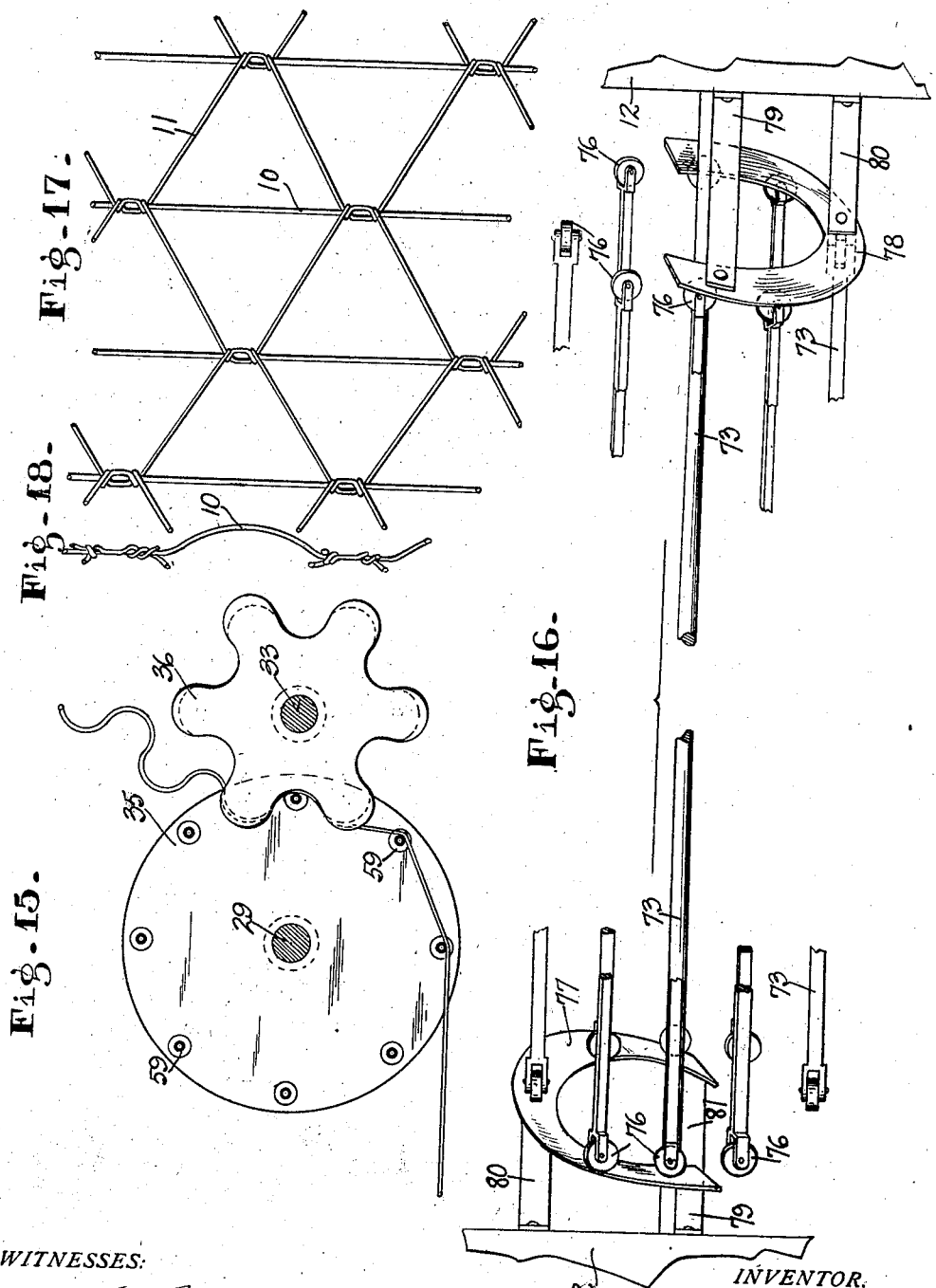

G. W. WHITTINGTON.
WIRE FABRIC MACHINE.
APPLICATION FILED DEC. 11, 1911.
1,061,432.
Patented May 13, 1913.
7 SHEETS—SHEET 7.
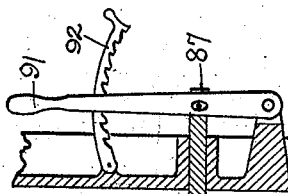
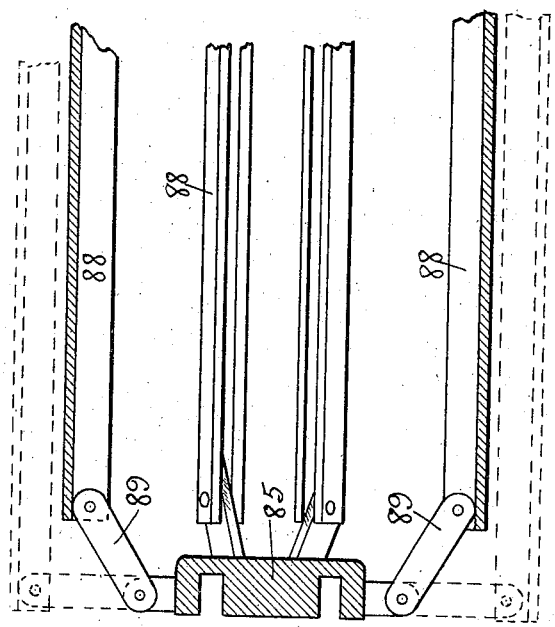
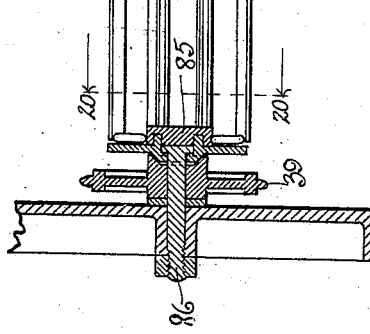
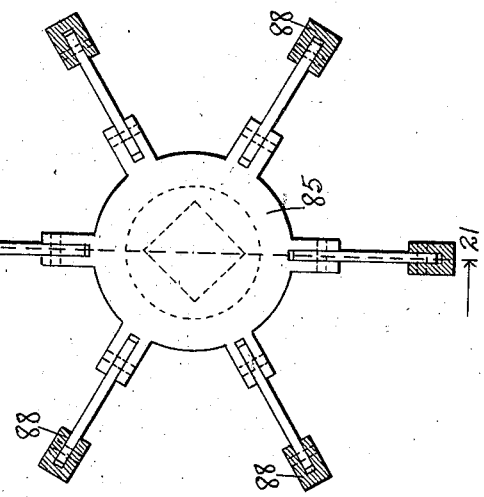
WITNESSES:
INVENTOR.
George W. Whittington
BY
ATTORNEY.

UNITED STATES PATENT OFFICE.

GEORGE W. WHITTINGTON, OF INDIANAPOLIS, INDIANA, ASSIGNOR, BY DIRECT AND MESNE ASSIGNMENTS, TO THE INDIANA MACHINE AND WIRE COMPANY, OF INDIANAPOLIS, INDIANA.

WIRE-FABRIC MACHINE.

1,061,432.     Specification of Letters Patent.     Patented May 13, 1913.

Application filed December 11, 1911. Serial No. 665,087.

*To all whom it may concern:*

Be it known that I, GEORGE W. WHITTINGTON, a citizen of the United States, and a resident of Indianapolis, county of Marion, and State of Indiana, have invented a certain useful Wire-Fabric Machine; and I do hereby declare that the following is a full, clear, and exact description thereof, reference being had to the accompanying drawings.

The object of this invention is to provide a machine which will automatically construct "diamond mesh" wire fabric in which the cross or mesh wires are continuous and which are secured to the strand wires without the use of separate tie wires.

One feature of the invention consists in the construction by which the manufacture of the wire fabric is continuous and the strand wires are not checked periodically in their progress through the machine for the purpose of having the mesh wires secured thereto, but the bond between the strand and mesh wires is made while the strand wires are being fed through the machine. The wire fabric not only travels all of the time through the machine, but always at the same rate of speed, there being no reduction in the speed while the mesh wires are being secured to the strand wires. This enables the machine to construct wire fabric very rapidly and not only increases the capacity of the machine, but decreases the cost of the machine.

A further feature lies in the manner in which a single twist of the double mesh wire is made the equivalent of the double twist of a single wire, imparting great stiffness to the fence.

A particular sort of a diamond mesh wire fabric which this machine has been constructed to build, consists of strand wires with a mesh wire intermediate each pair of strand wires and carried back and forth from one of said pair of strand wires to the other so that such mesh wire when the fabric is finished, will be zigzag and the bends therein will be bent around or united to the strand wires, and the bends of each adjacent pair of zigzag mesh wires are united to the strand wires between them at the same points. Hence the mesh wire does not travel across either strand wire during the making thereof. At each bend there is a double twist so as to give rapidity and strength to the union and to the fence.

The nature of the invention will be understood from the accompanying drawings and the following description and claims.

In the drawings, Figure 1 is a front elevation of the fence making machine. Fig. 2 is a right-end elevation of the machine as seen in Fig. 1. Fig. 3 is a left-end elevation of the same. Fig. 4 is a plan view of the machine with portions omitted. Fig. 5 is a vertical section on the line 5—5 of Fig. 2, with portions broken away and showing the mesh wire shift mechanism. Fig. 6 shows the same in an altered position. Fig. 7 shows in perspective a portion of the mesh wire guiding and shifting arms, and with altered positions shown by dotted lines. Fig. 8 is a section on the line 8—8 of Fig. 1, with the wires removed and portions broken away and showing the twister carrying means in elevation. Fig. 9 is a plan view of that which is shown in Fig. 8. Fig. 10 is a side elevation of a twister wheel as seen on the line 10—10 of Fig. 8, and with the strand and mesh wires lying therein. Fig. 11 shows the same as Fig. 10 after the twister wheel has made one complete revolution. Fig. 12 is a section on the line 12—12 of Fig. 10. Fig. 13 shows in detail the bond between an intermediate strand wire and two mesh wires. Fig. 14 shows the bond between a marginal wire and a mesh wire. Fig. 15 is a vertical section on the line 15—15 of Fig. 1. Fig. 16 shows the twister driving mechanism, with portions broken away and on a larger scale than shown in Fig. 4. Fig. 17 shows a portion of a finished fence fabric in elevation. Fig. 18 is a plan view of the same. Fig. 19 is a vertical section on the line 19—19 of Fig. 2, showing the reel for the finished fabric. Fig. 20 is a transverse section on the line 20—20 of Fig. 19. Fig. 21 is a longitudinal section on the line 21—21 of Fig. 20.

*The nature of the fence fabric.*—The kind of wire fencing or fabric which this machine is intended to make is illustrated in Figs. 17 and 18, with the mode of securing the mesh wires to the strand wires being shown in Figs. 13 and 14. This fabric consists of longitudinal or strand wires 10, the number thereof being immaterial, and cross or mesh wires 11 which individually extend back and forth between each pair of strand wires and are secured thereto in the manner hereinafter described without the use of tie wires of any sort. The strand wires may be straight, but are preferably crimped somewhat for the well known purpose of permitting the fabric to adjust itself under changes of temperature. The cross wires are zigzag and, as before mentioned, there is a continuous cross wire for each pair of strand wires, making acute angles with the strand wires and the doubled end of the adjacent cross wires on the two sides of a strand wire being twisted together once about the strand wire. By this construction the bond between each of the mesh and strand wires is the same at any point along the fence and the manufacture thereof is much simplified. when it is desired to make fencing in which the strand wires which lie closest to the ground, are closer together than those at the top of the fence.

*General structure of the machine.*—Looking now at the construction of the machine, it may be considered under the following parts, namely, frame, driving mechanism, strand wire feeding mechanism, the mesh wire feeding mechanism, and the means for securing the mesh wires to the strand wires.

The frame consists of rectangular end plates 12 having portions cut away to leave a horizontal stiffener 13 and a vertical stiffener 14. Said end plates are tied together by means of a longitudinal rod 15 an angle plate 16 and bar 60 and various shafts, hereafter explained. A transverse shaft 17, upon which the driving pulley 18 is secured, extends longitudinally of the machine and has bearings 19 secured to the horizontal top member 20 of the frame. An intermediate shaft 21 and a twister shaft 22, also extending longitudinally of the machine, have bearing 23 and 24, respectively, secured upon the horizontal members 20 of said frames 12.

*Driving mechanism.*—Power from any desired source is applied to the driving pulley 18 upon the shaft 17 which has a pinion 123 secured thereon which meshes with a gear 124 upon one end of the intermediate shaft 21, see Figs. 2 and 3, and upon the other end of said shaft 21 a pinion 25 is secured which meshes with a gear 26 upon the twister shaft 22. Upon the other end of the shaft 22 a sprocket wheel 27 is secured which drives a sprocket wheel 28 upon a longitudinally extending shaft 29 by means of a chain 30. A gear 31, secured upon the shaft 29, meshes with a second gear 32 upon a shaft 33 which has bearings 34 upon the lower part of the frames 12. The wheels 35 and 36, respectively, are secured upon the shafts 29 and 33 at desired intervals for the purpose of crimping the strand wires. A sprocket wheel 37 is secured upon the intermediate shaft 21 within the frame and drives the reel for the finished fabric by means of a chain 38 and a sprocket wheel 39 secured upon a shaft 40, upon which the reel is mounted. A short shaft 41 is mounted in a bearing 42 on the horizontal bar 13 of one end frame and has a gear 43 secured upon its outer end which meshes with the gear 26 upon the shaft 22, before mentioned. Both the gears 26 and 43 have a series of six outwardly projecting lugs 146 thereon and the gears are so timed as to alternately engage and oscillate an arm 46 upon a shaft 47 mounted in bearings 48 secured on the vertical side bars of the right end frame, as seen in Fig. 2. Upon one end of the shaft 47, and at the front of the machine, a rocking lever 49 is secured and to its ends the bars 50 and 51 are secured, respectively. The other ends of the bars 50 and 51 are secured to the strand wire shifter bars 53 and 52, respectively, see Figs. 1, 5 and 7.

*Strand wire feeding mechanism.*—The strand wires from the reels 54 pass between the crimping wheels 35 and 36 and from thence are led upward and fall, at the proper time, into the slots 55 in the twister wheels 56 mounted upon the outer ends of the arms 57 of the spiders 58. The shaft 29 being driven from the shaft 22 by means of the chain 30, sprockets 27 and 28, and the shaft 33 being driven from the shaft 29 by means of the gears 31 and 32, the strand wires are always under tension from the crimping wheels 35 and 36 upon said shafts 29 and 33 to the twister wheels 56. The crimping wheel 35 is of the squirrel-cage type, that is, the end plates are secured to the shaft 29 and have horizontal rods 59 connecting them and spaced apart so as to mesh with the crimping wheels 36 on the shaft 33. Stiffener plates 58 are mounted upon the shaft 29 between the end plates to prevent the bending of the rods 59 between said end plates as the strand wires are being crimped. In action the crimping wheels have the same effect as the old-time pin and toothed gear in crimping strand wires, that is, as the wires are fed between the squirrel cage and the crimping wheels 36, the rods 59 bear the wires toward the root of the gears 36 and crimp the same to enable the completed wire fabric to stretch under the influence of changes of temperature. The crimping wheels 35 and 36 being positively driven, no chance is given for the strand wires to slip and they are fed positively to the twister wheels, hereinafter mentioned.

*Mesh wire feeding mechanism.*—A bar 60 extends across the front of the machine and is secured to the end frames 12. Said bar has two series of arms mounted thereon which are oscillated by means of the bars 52 and 53 and links 51 and 50. One set of these arms is substantially shorter than the other, the short ones 61 being fulcrumed upon the rear side of the bar 60 and caused to oscillate by means of a pivotal connection 62 to the bar 53 whose right-hand end is pivotally connected to the bar 50, see Figs. 1 and 7. Arms 63 are fulcrumed upon the front side of the bar 60, as shown in Fig. 1, and are caused to reciprocate by the pivotal connection 64 with the bar 52, to the right end of which the link 51 is pivoted. The free upper ends 65 of these wire carrying arms 61 and 63 are bent inward, as shown in Fig. 7, and inclined toward the twister wheels hereinafter described, and a hole 66 is drilled through said bent portion from the straight vertical portion slightly larger in diameter than the diameter of the mesh wire which is to be used. The mesh wires 11 pass from the spools 67 through a pulley, not shown, to the arms 61 and 63 and pass through the holes 66 and are engaged by the twister wheels 56 at the proper time. As before described, the gears 26 and 43 in rotating, cause the oscillation of the shaft 47 which, in turn, causes the oscillation of the rocking lever 49 and through the links 50 and 51 will cause the bars 53 and 52, which operate the arms 61 and 63, to simultaneously move in opposite directions. The arm 61 being shorter than the arm 63, the mesh wire 11 actuated by it, will be delivered to a twister wheel 56 earlier in the rotation of the twister frame 58 than the mesh wire 11 actuated by the arm 63, for the purpose hereafter described. It will be readily understood that by this oscillation of the controlling bars 53 and 52, the wire carrying arms 61 and 63 will alternately be shifted from the left to the right, as shown in Fig. 1, and carry the mesh wire back and forth to the strand wire on either side.

*Means for uniting the strand wire and mesh wire.*—As shown in detail in Figs. 10 to 12, the twister wheels 56 are mounted in arms 57 upon the periphery of the spiders 58 which are secured upon the shaft 22. The twister 56 is mounted upon a spindle 70 which extends through the arms 57. The slot 55 extends radially from the periphery of said twister wheel beyond the center by an amount slightly greater than the diameter of the mesh wires 11. A slot 71 is also cut through the ends of the bars 57 such that when the slots 55 and 71 are in registry, the strand and mesh wires may be dropped therein and lie near the center of the spindle 70. The slot 55 extends into the spindle 70 and the outer ends of the spindle are beveled inwardly, as shown in Fig. 12. The periphery of the twister wheels 56 have teeth 72 cut therein which mesh with the teeth of the rack 73 which has movement longitudinally of the machine in slots 74 in the arms 57 of the spider 58. As shown in Fig. 8, each of said spiders has six sets of arms 57 with twister wheels 56 mounted therein and as shown in Figs. 4 and 8, the adjacent twister spiders are staggered with relation to each other, such that the twister wheels upon one spider are thirty degrees in advance of the twister wheels upon the adjacent spiders. The racks 73 have bearings in those spider wheels in which they cause the rotation of the twister wheels 56 and also in projections 75 in the intermediate spiders in which they cause no movement of the twister wheels. Said racks 73 extend longitudinally of the machine and beyond the spiders 58 and have rollers 76 mounted in their ends which bear against the tracks 77 and 78 as the twister wheels are revolved and which thus reciprocate transversely of the machine. The tracks 77 and 78 are secured to the end frames 12 by means of the straps 79, 80 and 81. The track 77 has a plane portion concentric with the shaft 22 and extends thereabout for substantially sixty degrees after which it is helically disposed in outline and concentric with the shaft 22 and made a regular advance about the shaft for substantially one hundred and twenty degrees. The track 78 is helically disposed about the shaft 22 and concentric therewith and extends about the same for substantially one hundred and eighty degrees. It will be noted that the helically disposed portion of the track 77 has its advance toward the left, while the helical portion of track 78 advances toward the right. The track 78 is secured to the frame diametrically opposite to the track 77. Thus the rollers 76 upon the rack bars 73, on engaging the track 77, will not be shifted during the first sixty degrees of the revolution of the shaft 22, but will be moved to the right, as seen in Fig. 16, during the next one hundred and twenty degrees of the revolution and then the rollers 76 upon the opposite ends of said rack bars 73 will be engaged by the track 78 and pushed back toward the left during the next one hundred and eighty degrees of the revolution of the shaft. While the tracks 77 and 78 are shown as extending for substantially more than one hundred and eighty degrees about the shaft 22, this is a constructional feature, as theoretically they need extend but one hundred and eighty degrees about said shaft. This reciprocation of the racks 73 will, of course, cause the rotation of the wheels 56 mounted upon the spiders 58 and the design of the rack 73 and the tracks 77 and 78 is such that the twister wheels will be given one revolution during each throw of the rack 73.

As before mentioned the spiders 58 are staggered in their mounting upon the shaft 22. Thus the twisters 56 upon the odd numbered spiders 58, counting from the left in Fig. 1, are in synchronism and the twisters 56 upon the even numbered spiders 58 are in synchronism, although retarded thirty degrees with respect the former. In speaking of the "entering" position of the twisters, that position is meant where the rollers 76 upon the rack bars 73 have just entered the plane portion of the track 77 and by the "advanced" position of the twisters is meant that position, sixty degrees in advance of the entering position, where the rollers 76 are just about to enter upon the spiral portion of the track 77. By "intermediate" position is meant that position half way between said "entering" and "advanced" positions, or thirty degrees in advance of the "entering" position.

With the machine in operation, the shaft 22 with the spiders 58 thereon will be operated in a clockwise direction, as shown in Fig. 2, and the twister wheels 56 will advance toward the front from the underside of the shaft 22. The short wire carrying arms 61 will be moved at the proper time into registry with the slots 55 in the lowest or first row of the twister wheels 56, carried by the arms 57, which have just moved into the "entering" position and the mesh wires 11 carried by said arms 61 will enter the slots 55 and pass to the bottom of said slots. Simultaneous with this movement of the arms 61, the long wire carrying arms 63 have been moved into registry with that row of twister wheels, upon the same spiders 58, which have entered the "advanced" position and the mesh wires 11 carried by these arms 63 will enter the twister slots 55 and lie upon the strand and mesh wires therein. As there are six lugs 146 upon each of the wheels 26 and 43, said arms 61 and 63 will be oscillated once for each thirty degree turn of the shaft 22 with the spiders 58 thereon. Thus, after the mesh wires have entered the slots 55 in the entering and advanced set of twisters 56 upon one set of spider wheels, and the shaft 22 has turned thirty degrees, the wire carrying arms will be oscillated and the mesh wires 11 will be carried to the second set of spiders thirty degrees retarded from the first-mentioned set and will enter the slots in the twisters thereon. While the mesh wires are being directed to the entering and advanced twisters upon this second set of spiders 58 the strand wires 10 have fallen into the upwardly moving slots 55 in the first row of twisters upon the first set of spiders which have moved to the "intermediate" position. A further rotation of thirty degrees by the shaft 22, will move the first row of twisters upon the first set of spiders to the "advanced" position where the mesh wire 11 will enter the slots 55 in the twisters and lie upon the other mesh wire 11 and the strand wire 10. Simultaneous with this the strand wires are being engaged by the slots 55 of the twisters in "intermediate" position on the second set of spiders. The mesh wires 11 are thus caused to zigzag between the strand wires 10 and are bent at each intersection therewith. After passing the advanced position the twisters are caused to rotate, the rollers 76 engaging with the advancing portion of the track 77 and causing the longitudinal movement of the rack bars 73. The short wire carrying arms 61 will be moved at the proper time into regstry with the slots 55 in one row of the twister wheels 56 carried by the arms 57 and the wires carried by the arms 61 will enter the slots, and as the twisters revolve the wires will be drawn into the bottom of the slots. As the twister wheels are revolved further, the strand wires 10 will enter the slots and lie upon the lower mesh wires 11 which previously entered the slots. Further rotation of the shaft 22 will cause the lever 46 to be thrown by one of the lugs 146 on wheel 26, the shaft 47 will be oscillated and the bars 52 and 53 will be thrown and the longer wire carrying arms 63 will be moved into registry with the same row of twister wheels and the mesh wires carried thereby will enter the slots 55 upon the strand wires 10. During this portion of the rotation of the spider wheels 58, the rack 73 has been bearing against a portion of the track 77 which has not advanced. Thus during practically sixty degrees of the first part of the revolution of the twister wheels 58 measured from the point where the mesh wire 11 is laid into the slot 55 by means of the short wire carrying arm 61, the twister wheels will not be rotated, and the slots 55 and 71 are in registry. From the end of this period, however, for approximately one hundred and twenty degrees of the revolution of the spider wheels, the racks 73 are pushed toward the right and the twister wheels are given one complete rotation. This single rotation of the twister wheel will cause the bends in the mesh wires 11 to be twisted once about the strand wires 10 and twisted together after the manner shown in Fig. 17, and in detail in Fig. 18. There will be in reality two twisted portions separated by a distance equal to the length of the spindle 70 of the twister wheel 56. Between these two twists, the strand wire 10 and the mesh wires 11 lie parallel. This twisting of the two mesh wires is equivalent to the double twist of the single wire, so far as the strength of the union between the strand wire and mesh wires is concerned, and the twists being separated slightly imparts considerable rigidity to the fabric. During this twisting operation the strand wire 10 has occupied a position concentric with the twister wheel 56 and, therefore, it will remain untwisted and the bends in the wires will be twisted about it.

It will be noted from the drawings that to the marginal strand wires, only one mesh wire will be secured, fed through the long arm 63, but twisted thereon in the same manner as for the intermediate strand wire. Such a marginal twist is shown in Fig. 14. After the spiders 58 have passed through this first one hundred and eighty degrees of their travel, the wheels 76 upon the left-hand end of the racks 73 will leave the track 77 and the wheels 76 upon the right-hand end of said racks will engage the track 78 and a return movement of the racks 73 will be caused with a corresponding turning of the twister wheels 56 operated by said racks. During the intermediate period between the leaving of the track 77 and the entering on the track 78, the finished fabric will drop out of the slots 55 in the twister wheels and will pass down to the reel 80 where the fabric will be reeled.

The reel construction constitutes no necessary part of this invention, as it has been previously patented to me October 4, 1904, No. 771,405. As shown in Figs. 19, 20 and 21, the reel consists of the central shaft portion 85 with end spindles 86 and 87. The sprocket wheel 39 is held in place against side movement on the spindle 86 by the end frame 12 and by the inner shaft portion 85 which in turn is held in place by the head on the inner end of said spindle 86. The links 89 are pivoted at their ends to the bars 88 and also pivoted to the head of the inner shaft portion 85, so that said bars can collapse by being moved to the right hand, as shown in Fig. 21. The fabric is wound over the reel bars 88 when they are in their outer position, and they are held in that outer position by a disk 90 on the spindle 87 which is moved longitudinally by a lever 91, and said lever is held in place by a rack 92 secured to the end frame 12. When the lever 91 is moved to the left to the position shown in Fig. 19 the disk 90 forces all of the bars 88 to the left from the full line position shown in Fig. 21, to the full line position shown in Fig. 19, or the dotted line position shown in Fig. 21. After the coil of fabric has been finished, the lever 91 is thrown to the right from the position shown in Fig. 19, and the spindle 87 is disengaged which permits the reel to drop down or be moved with the fabric thereon and then the outer bars 88 of the reel will readily collapse so that the reel can be drawn out of the coil of fabric. After this the reel is replaced.

It must be understood that the mesh wire carrying arms 61 and 63 are in registry with the wheels at the extreme limit of movement of said arms in each direction and both types of arms are in registry with different twister wheels upon the same spiders at the same time, the long arms being in registry with the twisters in the row in advance of the row of twisters with which the short arms are in registry and the lateral throw moves each of said arms from one peripheral row of twisters to the next one and back again so that when said arms are at their extreme left-hand positions, a short arm will be in registry with one peripheral row of twisters, while the long arm will be in registry with the next peripheral row of twisters upon the same spider, but at the other or right-hand limit of movement of said arms, said short arm will be in registry with the peripheral row of twisters with which the long arm which was previously in registry and the long arm will be in registry with the next peripheral row of twisters to the right. Hence these arms by being thrown back and forth carry the mesh wire from one strand wire to the next and by having a double set of arms, one longer than the other, not only is the capacity of the machine doubled, and the extent of throw of the arms reduced one half, but the mesh wire carried by the long arm will be put into the slot after the other mesh wire has been put into the slot, and, therefore, cause said mesh wires to enter the slot in the right consecutive order. Guard frames 95 and 96 surround the tracks 77 and 78, respectively, and protect the operator.

I claim as my invention:

1. A machine for making wire fabric, including means for moving parallel strand wires through the machine, means for carrying a mesh wire from one strand wire to the next strand wire and back again alternately, and means for twisting each bend of a mesh wire about the strand wire at two points spaced apart so that a portion of the mesh wire at each bend will lie parallel with the strand wire.

2. A machine for making wire fabric, including means for moving a series of parallel strand wires through the machine, means for carrying a mesh wire from one strand wire of each pair of strand wires to the next strand wire of each pair and back again alternately, the bends of adjacent mesh wires registering with each other, and means for twisting the adjacent bends of the mesh wires about the strand wires and in the same direction so that they will interlock.

3. A machine for making wire fabric, including a rotary frame, a series of twisters revolubly mounted thereon so as to be rotatable in planes bisecting each other at the axis of the frame, means on said frame for rotating said twisters, means for maintaining and moving a pair of strand wires into position so that each will be engaged by one of said twisters, arms pivoted on said frame and projecting into proximity with the path of said twisters, a single means for oscillating said arms between each pair of twisters for alternately placing a mesh wire therein, and means for actuating the twisters.

4. A machine for making wire fabric, including a plurality of sets of twisters arranged in staggered position with reference to each other, means for revolving said twister sets in substantially parallel planes, means for maintaining and moving marginal strand wires into position to be engaged by two of said twister sets, means moving transversely said twisters for placing mesh wires first in one twister and then in the next twister adjacent thereto, oppositely moving transversely moving means for placing a second mesh wire in said twisters after the first mesh wire has been placed therein, and means for actuating the twisters.

5. A machine for making wire fabric, including a frame for a transverse bar, a transverse series of twisters, means for revolving said twisters in a plane longitudinally of the machine, means for maintaining and moving a series of strand wires in position to receive said twisters as they are revolved, arms pivoted on said frame and projecting into proximity with the path of the twisters, a single means for oscillating said arms transversely of the machine between each pair of twisters for placing alternately therewith a mesh wire, and means for actuating the twister.

6. A machine for making wire fabric, including a plurality of transverse rows of twisters arranged in staggered position alternately with reference to each other, means for revolving them in a plane longitudinally of the machine, means for maintaining and moving a strand wire adapted to be engaged by each twister as it is revolved, transversely moving means reciprocatory between each pair of twisters for placing mesh wires first in one twister and then in the next twister adjacent thereto, one of said means adapted to place one mesh wire in a twister before the twister receives the strand wire, an intermediate set of said means for placing the adjacent mesh wire in any one twister after it has received the strand wire, and means for actuating the twisters.

7. A machine for making wire fabric, including a main fixed frame, a revoluble frame extending transversely of the machine and revolved in a plane cutting the machine longitudinally, a plurality of transverse rows of twisters, the twisters of the adjacent rows being staggered in position relative to each other so that there is a number of peripheral rows of twisters, means for maintaining and moving a strand wire for each peripheral row of twisters, an arm movably mounted in connection with the main frame for carrying and transversely reciprocating a mesh wire between each peripheral row of twisters and alternately placing said mesh wire in a twister in first one row and then in the next row, each alternate arm being longer than the other arms so that each alternate mesh wire will be placed by the short arms into the twister before the twisters receive the strand wires and the adjacent mesh wires and the other mesh wires will be placed in said twisters by the long arms after the twisters have received the strand wires, and means for actuating the twisters.

8. A machine for making wire fabric, including a main fixed frame, a revoluble frame extending transversely of the machine and revolved in a plane cutting the machine longitudinally, a plurality of transverse rows of twisters, the twisters of the adjacent rows being staggered in position relative to each other so that there is a number of peripheral rows of twisters, means for maintaining and moving a strand wire for each peripheral row of twisters, an arm movably mounted in connection with the main frame for carrying and transversely reciprocating a mesh wire between each peripheral row of twisters and alternately placing said mesh wire in a twister in first one row and then in the next row, each alternate arm being longer than the other arms so that each alternate mesh wire will be placed by the short arms into the twisters before the twisters receive the strand wires and the adjacent mesh wires and the other mesh wires will be placed in said twisters by the long arms after the twisters have received the strand wires, means for simultaneously reciprocating all of said mesh wire carrying arms in one direction and then in the other, and means for actuating the twisters.

9. A machine for making wire fabric, including a main fixed frame, a revoluble frame extending transversely of the machine and revolved in a plane cutting the machine longitudinally, a plurality of transverse rows of twisters, the twisters of the adjacent rows being staggered in position relative to each other so that there is a number of peripheral rows of twisters, means for maintaining and moving a strand wire for each peripheral row of twisters, an arm movably mounted in connection with the main frame for carrying and transversely reciprocating a mesh wire between each peripheral row of twisters and alternately placing said mesh wire in a twister in first one row and then in the next row, each alternate arm being sufficiently longer than the other arms to reach and place the mesh wires in the transverse row of twisters preceding the row of twisters being served by the short arms, a bar pivotally mounted to each series of arms, and a rocking lever connected with said bars for reciprocating the two sets of arms simultaneously in opposite directions.

10. A machine for making wire fabric, including a revoluble twister frame, rotary twisters mounted thereon in transverse and peripheral rows, rack bars mounted in said frame for actuating each transverse row of twisters, and spirally disposed tracks in fixed position at each end of said twister frame for engaging the ends of said racks and reciprocating the same, said tracks being arranged diametrically oppositely to each other so that they will alternately actuate the racks and each track also formed so that it will actuate each rack, while the same is revolved through about one hundred and twenty degrees and during the remainder of the revolution will not actuate said rack whereby one track will actuate a rack for about one hundred and twenty degrees and there will be no actuation for about sixty degrees and the other track will return the rack through one hundred and twenty degrees and during the next sixty degrees there will be no actuation of the rack.

In witness whereof, I have hereunto affixed my signature in the presence of the witnesses herein named.

GEORGE W. WHITTINGTON.

Witnesses:
J. H. WELLS,
E. H. MAYO.